United States Patent
Bergström et al.

(10) Patent No.: US 12,369,054 B2
(45) Date of Patent: Jul. 22, 2025

(54) FAILURE REPORTING FOR NON-PUBLIC NETWORKS IN 5G

(71) Applicant: Telefonaktiebolaget LM Ericsson (publ), Stockholm (SE)

(72) Inventors: Mattias Bergström, Sollentuna (SE); Pradeepa Ramachandra, Linköping (SE); Oscar Ohlsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 402 days.

(21) Appl. No.: 18/040,661

(22) PCT Filed: Aug. 18, 2021

(86) PCT No.: PCT/SE2021/050806
§ 371 (c)(1),
(2) Date: Feb. 6, 2023

(87) PCT Pub. No.: WO2022/039657
PCT Pub. Date: Feb. 24, 2022

(65) Prior Publication Data
US 2023/0284051 A1    Sep. 7, 2023

Related U.S. Application Data

(60) Provisional application No. 63/067,081, filed on Aug. 18, 2020.

(51) Int. Cl.
*H04W 24/04* (2009.01)
*H04W 84/04* (2009.01)

(52) U.S. Cl.
CPC .......... *H04W 24/04* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2014/0023032 A1 | 1/2014 | Kim et al. | |
| 2014/0295825 A1* | 10/2014 | Chuang | H04L 1/02 455/425 |
| 2024/0116551 A1* | 4/2024 | Chen | B61L 15/0027 |

FOREIGN PATENT DOCUMENTS

WO    WO-2021066171 A1 *    4/2021    ........... H04L 63/101

OTHER PUBLICATIONS

International Search Report and Written Opinion dated Nov. 22, 2021 for International Application No. PCT/SE2021/050806 filed Aug. 18, 2021, consisting of 15-pages.

(Continued)

*Primary Examiner* — Robert M Morlan
(74) *Attorney, Agent, or Firm* — Weisberg I.P. Law, P.A.

(57) ABSTRACT

Embodiments include methods for failure reporting by a user equipment (UE) operating in a cell of a first network. Such methods include sending, to a network node serving the cell, a message that includes a first indication of availability of one or more failure reports. Each available failure report corresponds to a failure that occurred while the UE was operating in the first network, a network different than the first network, or a network of a different type than the first network. Such methods also include receiving, from the network node, a request for at least a portion of the failure reports indicated as available by the first indication; and sending at least one of the available failure reports to the network node in accordance with the request. Other embodiments include complementary methods for a network node as well as UEs and network nodes configured to perform such methods.

20 Claims, 5 Drawing Sheets

(56) References Cited

OTHER PUBLICATIONS

3GPP TS 33.401 V15.8.0; 3rd Generation Partnership Project; Technical Specification Group Services and System Aspects; 3GPP System Architecture Evolution (SAE); Security architecture (Release 15), Jun. 2019, consisting of 163-pages.

3GPP TS 38.401 V15.6.0; 3rd Generation Partnership Project; Technical Specification Group Radio Access Network; NG-RAN; Architecture description (Release 15), Jul. 2019, consisting of 46-pages.

3GPP TS 23.501 V15.5.0; 3rd Generation Partnership Project; Technical Specification Group Services and System Aspects; System Architecture for the 5G System; Stage 2 (Release 15), Mar. 2019, consisting of 241-pages.

3GPP TS 33.501 V15.9.0; 3rd Generation Partnership Project; Technical Specification Group Services and System Aspects; Security architecture and procedures for 5G System (Release 15), Jul. 2020, consisting of 192-pages.

3GPP TS 23.501 V16.5.1; 3rd Generation Partnership Project; Technical Specification Group Services and System Aspects; System Architecture for the 5G System (5GS); Stage 2 (Release 16), Aug. 2020, consisting of 440-pages.

3GPP TR 38.801 V14.0.0; 3rd Generation Partnership Project; Technical Specification Group Radio Access Network; Study on new radio access technology: Radio access architecture and interfaces (Release 14), Mar. 2017, consisting of 91-pages.

3GPP TSG-RAN WG2 Meeting #110 electronic R2-2004417; Title: Corrections on Sensor Measurement; Agenda Item: 6.12.4; Source: CATT; Document for: Discussion and Decision; Date and Location: Jun. 1-12, 2020; Online, consisting of 31-pages.

3GPP TSG-RAN WG2 Meeting #111e R2-2007512/R2-2005618; Title: Impact of SNPN on PLMN Check for MDT; Agenda Item: 6.10.1; Source: Nokia, Nokia Shanghai Bell; Document for: Discussion and Decision; Date and Location: Aug. 17-28, 2020, Online, consisting of 4-pages.

\* cited by examiner

FIG. 3

```
-- ASN1START
-- TAG-RRCREESTABLISHMENTCOMPLETE-START
RRCReestablishmentComplete ::=         SEQUENCE {
    rrc-TransactionIdentifier              RRC-TransactionIdentifier,
    criticalExtensions                     CHOICE {
        rrcReestablishmentComplete             RRCReestablishmentComplete-IEs,
        criticalExtensionsFuture               SEQUENCE {}
    }
}

RRCReestablishmentComplete-IEs ::= SEQUENCE {
    lateNonCriticalExtension               OCTET STRING                              OPTIONAL,
    nonCriticalExtension                   RRCReestablishmentComplete-v16xy-IEs      OPTIONAL
}

RRCReestablishmentComplete-v16xy-IEs ::=   SEQUENCE {
    logMeasAvailable-r16                   ENUMERATED {true}                         OPTIONAL,
    logMeasAvailableBT-r16                 ENUMERATED {true}                         OPTIONAL,
    logMeasAvailableWLAN-r16               ENUMERATED {true}                         OPTIONAL,
    connEstFailInfoAvailable-r16           ENUMERATED {true}                         OPTIONAL,
    rlf-InfoAvailable-r16                  ENUMERATED {true}                         OPTIONAL,
    nonCriticalExtension                   SEQUENCE {}                               OPTIONAL
}

-- TAG-RRCREESTABLISHMENTCOMPLETE-STOP
-- ASN1STOP
```

FIG. 4

```
-- ASN1START
-- TAG-UEINFORMATIONREQUEST-START
UEInformationRequest-r16 ::=         SEQUENCE {
    rrc-TransactionIdentifier              RRC-TransactionIdentifier,
    criticalExtensions                     CHOICE {
        ueInformationRequest-r16               UEInformationRequest-r16-IEs,
        criticalExtensionsFuture               SEQUENCE {}
    }
}

UEInformationRequest-r16-IEs ::= SEQUENCE {
    idleModeMeasurementReq-r16             ENUMERATED{ffs}                           OPTIONAL,   -- Need N
    logMeasReportReq-r16                   ENUMERATED {true}                         OPTIONAL,
    connEstFailReportReq-r16               ENUMERATED {true}                         OPTIONAL,
    ra-ReportReq-r16                       ENUMERATED {true}                         OPTIONAL,
    rlf-ReportReq-r16                      ENUMERATED {true}                         OPTIONAL,
    mobilityHistoryReportReq-r16           ENUMERATED {true}                         OPTIONAL,
    lateNonCriticalExtension               OCTET STRING                              OPTIONAL,
    nonCriticalExtension                   SEQUENCE {}                               OPTIONAL
}

-- TAG-UEINFORMATIONREQUEST-STOP
-- ASN1STOP
```

```
-- ASN1START
-- TAG-UEINFORMATIONRESPONSE-START
UEInformationResponse-r16 ::=      SEQUENCE {
    rrc-TransactionIdentifier          RRC-TransactionIdentifier,
    criticalExtensions                 CHOICE {
        ueInformationResponse-r16          UEInformationResponse-r16-IEs,
        criticalExtensionsFuture           SEQUENCE {}
    }
}
UEInformationResponse-r16-IEs ::= SEQUENCE {
    measResultIdleEUTRA-r16        MeasResultIdleEUTRA-r16       OPTIONAL,
    measResultIdleNR-r16           MeasResultIdleNR-r16          OPTIONAL,
    logMeasReport-r16              LogMeasReport-r16             OPTIONAL,
    connEstFailReport-r16          ConnEstFailReport-r16         OPTIONAL,
    ra-ReportList-r16              RA-ReportList-r16             OPTIONAL,
    rlf-Report-r16                 RLF-Report-r16                OPTIONAL,
    mobilityHistoryReport-r16      MobilityHistoryReport-r16     OPTIONAL,
    lateNonCriticalExtension       OCTET STRING                  OPTIONAL,
    nonCriticalExtension           SEQUENCE {}                   OPTIONAL
}
...
RLF-Report-r16 ::=             CHOICE {
    nr-RLF-Report-r16              SEQUENCE {
        measResultLastServCell-r16    MeasResultRLFNR-r16,
        measResultNeighCells-r16      SEQUENCE {
            measResultListNR-r16          MeasResultList2NR-r16    OPTIONAL,
            measResultListEUTRA-r16       MeasResultList2EUTRA-r16 OPTIONAL
        }                                                          OPTIONAL,
        c-RNTI-r16                    RNTI-Value,
        previousPCellId-r16           CGI-Info-LoggingDetailed-r16   OPTIONAL,
        failedPCellId-r16             CHOICE {
            cellGlobalId-r16              CGI-Info-LoggingDetailed-r16,
            pci-arfcn-r16                 SEQUENCE {
                physCellId-r16                PhysCellId,
                carrierFreq-r16               ARFCN-ValueNR
            }
        }                                                            OPTIONAL,
        reestablishmentCellId-r16     CGI-Info-Logging-r16           OPTIONAL,
        timeConnFailure-r16           INTEGER (0..1023)              OPTIONAL,
        timeSinceFailure-r16          TimeSinceFailure-r16,
        connectionFailureType-r16     ENUMERATED {rlf, hof}          OPTIONAL,
        rlf-Cause-r16                 ENUMERATED {t310-Expiry,
                                          randomAccessProblem, rlc-MaxNumRetx,
                                          beamFailureRecoveryFailure, spare4,
                                          spare3, spare2, spare1},
        locationInfo-r16              LocationInfo-r16               OPTIONAL,
        absoluteFrequencyPointA-r16   ARFCN-ValueNR                  OPTIONAL,
        locationAndBandwidth-r16      INTEGER (0..37949)             OPTIONAL,
        subcarrierSpacing-r16         SubcarrierSpacing              OPTIONAL,
        msg1-FrequencyStart-r16       INTEGER (0..maxNrofPhysicalResourceBlocks-1)
                                                                     OPTIONAL,
        msg1-SubcarrierSpacing-r16    SubcarrierSpacing              OPTIONAL,
        msg1-FDM-r16                  ENUMERATED {one, two, four, eight} OPTIONAL,
        perRAInfoList-r16             PerRAInfoList-r16              OPTIONAL,
        noSuitableCellFound-r16       ENUMERATED {true}              OPTIONAL
    },
    eutra-RLF-Report-r16              SEQUENCE {
        failedPCellId-EUTRA               CGI-InfoEUTRALogging,
        measResult-RLF-Report-EUTRA-r16   OCTET STRING
    }
}
...
-- TAG-UEINFORMATIONRESPONSE-STOP
-- ASN1STOP
```

FIG. 5

FAILURE REPORTING FOR NON-PUBLIC NETWORKS IN 5G

CROSS-REFERENCE TO RELATED APPLICATIONS

This application is a Submission Under 35 U.S.C. § 371 for U.S. National Stage Patent Application of International Application No.: PCT/SE2021/050806, filed Aug. 18, 2021 entitled "FAILURE REPORTING FOR NON-PUBLIC NETWORKS IN 5G," which claims priority to U.S. Provisional Application No. 63/067,081, filed Aug. 18, 2020, entitled "FAILURE REPORTING FOR NON-PUBLIC NETWORKS IN 5G," the entireties of both of which are incorporated herein by reference.

TECHNICAL FIELD

The present application relates generally to the field of wireless communication networks, and more specifically to reporting of failures experienced by a user equipment (UE) while operating in a non-public network (NPN), such as when the UE has moved to a different network than the one(s) in which the failure(s) occurred.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases too.

3GPP security standardization working group SA3 specified the security-related features for Release 15 (Rel-15) of the 5G System (5GS) in 3GPP TS 33.501. In particular, 5GS includes many new features (e.g., as compared to earlier 4G/LTE systems) that required introduction of new security mechanisms. For example, 5GS seamlessly integrates non-3GPP access (e.g., via wireless LAN) together with 3GPP access (e.g., NR and/or LTE). As such, in 5GS, a user equipment (UE, e.g., wireless device) can access services independent of the underlying radio access technology (RAT).

3GPP Rel-16 also specifies support for Non-Public Networks (NPN) that are for non-public use. This is described in 3GPP TS 23.501. More specifically, NPNs can be deployed and/or managed by an entity other than operators of Public Land Mobile Networks (PLMNs), which are also referred to herein as "normal operators." Each PLMN has a unique identify called "PLMN ID". In some cases, however, operators of two (or more) PLMNs can have an agreement such that the two PLMNs can be considered equivalent from a user perspective. 3GPP specifications currently do not allow equivalent NPNs, but it would be possible to introduce this concept in the future.

NPNs can be deployed as a Stand-alone Non-Public Network (SNPN) when they do not rely on network functions provided by a public land mobile network (PLMN). Typically, an SNPN would be operated by an entity other than a normal operator. An example SNPN is a factory or other industrial facility that deploys its own 5GS to provide connectivity for both equipment and workers.

An SNPN is identified by a PLMN ID and network ID (NID) that are broadcast in system information block 1 (SIB1) in the cells of the SNPN. AN SNPN operator typically does not own the SNPN's PLMN ID. However, the SNPN operator may make an agreement with a PLMN operator to use the PLMN operator's PLMN ID in the deployment area of the SNPN. Alternately, the SNPN operator can use a special PLMN ID (i.e., one that is not normally used, invalid, etc.) as part of the SNPN identity.

Alternately, an NPN can be deployed as a Public Network Integrated (PNI) NPN when it relies on functions provided by a PLMN. Like SNPNs, a PNI-NPN may be deployed to offer service to a closed group of users, e.g., equipment and workers in a factory. Because a PNI-NPN relies on PLMN functions, it may be managed by the operator of the PLMN into which the PNI-NPN is integrated.

A PNI-NPN uses Closed Access Groups (CAGs) to identify groups of subscribers who are permitted to access one or more cells associated with the PNI-NPN. CAG identifiers are broadcast in SIB1 (e.g., instead of NIDs used in SNPNs) in the cells of an PNI-NPN. A CAG-capable user equipment (UE) can be configured with the following per PLMN:

Allowed CAG list containing the CAG identifiers that the UE is allowed to access; and CAG-only indication if the UE is only allowed to access 5GS via CAG cells.

A UE checks the suitability of CAG cells based on the Allowed CAG list provided by upper layers. When the UE is configured with a CAG-only indication, only CAG Member Cells can be suitable. A non-suitable cell can be acceptable though if the UE is configured with a CAG-only indication for one of the PLMN broadcast by the cell. Other UEs not configured to use a CAG do not have access to an PNI-NPN. In other words, a PNI-NPN verifies whether a UE attempting to connect is a member of a CAG that is allowed access to the PNI-NPN. If so, the UE is given access to the PNI-NPN.

A UE may experience various types of failures while operating in a network, such as a PLMN or NPN. As one example, a UE can experience a random-access failure when the UEs tries to connect to a cell in the network. There are mechanisms for the UE to log information related to these failures and later report the logged information to the network. The UE first indicates availability of logged failure information to the network, which can then send a request for the UE to report the logged failure information. For example, the network can use the reported failure information for network tuning and/or optimization (e.g., of cell parameters) with the goal of reducing and/or eliminating future UE failures.

A UE may have access to several networks or different network types (e.g., SNPN, PNI-NPN, and PLMN), which may be managed by the same or different entities. Even so, UEs are currently unable to report logged information about failures that occurred in one type of network (e.g., PLMN) to another type of network (e.g., SNPN). This can create various problems, issues, and/or difficulties for management of different networks, even if the different networks are owned and/or managed by a single entity.

SUMMARY

Accordingly, embodiments of the present disclosure address these and other problems, issues, and/or difficulties related to UE failure reporting, thereby enabling the otherwise-advantageous deployment of NPNs based on 5GS.

Some embodiments of the present disclosure include methods (e.g., procedures) for failure reporting by a UE operating in a cell of a first network.

These exemplary methods can include sending, to a network node serving the cell, a message that includes a first indication of availability of one or more failure reports. Each available failure report corresponds to a failure that occurred while the UE was operating in the first network, a network different than the first network, or a network of a different type than the first network. These exemplary methods can also include receiving, from the network node, a request for at least a portion of the failure reports indicated as available by the first indication. These exemplary methods can also include sending at least one of the available failure reports to the network node, in accordance with the request.

In some embodiments, for each available failure report, the first indication can indicate whether the corresponding failure occurred while the UE was operating in the first network, a network different than the first network, or a network of a different type than the first network.

In some of these embodiments, for each available failure report, the first indication is one of the following:
  a first variable that can take on at least first and second values, wherein the first value indicates the corresponding failure occurred while the UE was operating in the first network and the second value indicates the corresponding failure occurred while the UE was operating in a network different than the first network; or
  presence or absence of a second variable, where presence indicates the corresponding failure occurred while the UE was operating in the first network and absence indicates the corresponding failure occurred while the UE was operating in a network different than the first network. An opposite convention is also possible.

In other of these embodiments, for each available failure report, the first indication is one of the following:
  a first variable that can take on at least first and second values, wherein the first value indicates the corresponding failure occurred while the UE was operating in the first network and the second value indicates the corresponding failure occurred while the UE was operating in a network of a different type than the first network;
  presence or absence of a second variable, wherein presence indicates the corresponding failure occurred while the UE was operating in the first network and absence indicates the corresponding failure occurred while the UE was operating in a network of a different type than the first network (an opposite convention is also possible); or
  a third variable that can take on a plurality of values, wherein each value is associated with a particular type of network in which the corresponding failure occurred.

In some embodiments, the respective values for the third variable can be associated with the following respective types of networks: public land mobile network (PLMN); standalone non-public network (SNPN); and public network integrated NPN (PNI-NPN).

In some embodiments, the one or more failure reports (e.g., indicated as available) can include a second failure report corresponding to a second failure that occurred while the UE was operating in a second network. In various embodiments, one of the following applies:
  the first network is a PLMN and the second network is an NPN;
  the first network is an NPN and the second network is a PLMN; or
  the first network is a first NPN and the second network is a second NPN.

In some embodiments, for each available failure report that corresponds to a failure that occurred while the UE was operating in a network different than the first network, the first indication includes an identifier of the network in which the corresponding failure occurred.

In some embodiments, the request can include a second indication that available failure reports are requested for UE failures that occurred in one of the following:
  only the first network;
  all networks;
  one or more particular networks; or
  one or more particular types of networks.

In some of these embodiments, the one or more particular networks can be indicated by respective PLMN identities (IDs). In some of these embodiments, the at least one failure report can include:
  a first failure report corresponding to a UE failure that occurred in an NPN associated with a first PLMN ID; and
  a second failure report corresponding to a UE failure that occurred in a PLMN associated with the first PLMN ID.

In some embodiments, these exemplary methods can also include receiving, from the network node, a third indication of network interest in failure reports pertaining to one or more of the following: a network different than the first network; and a network of a different type than the first network.

In some of these embodiments, when the third indication indicates no network interest in failure reports pertaining to a network different than the first network, the first indication does not indicate availability of failure reports corresponding to failures that occurred while the UE was operating in a network different than the first network, even when such failure reports are available at the UE.

In other of these embodiments, when the third indication indicates no network interest in failure reports pertaining to a network of a different type than the first network, the first indication does not indicate availability of failure reports corresponding to failures that occurred while the UE was operating in a network of a different type than the first network, even when such failure reports are available at the UE.

Other embodiments include methods (e.g., procedures) for receiving failure reports by a UE operating in a cell in a first network. These exemplary methods can be performed by a network node (e.g., base station, eNB, gNB, ng-eNB, en-gNB, etc.) serving the cell in the first network (e.g., PLMN, SNPN, PNI-NPN).

These exemplary methods can include receiving, from the UE, a message that includes a first indication of availability of one or more failure reports. Each failure report corresponds to a failure that occurred while the UE was operating in the first network, a network different than the first network, or a network of a different type than the first network. These exemplary methods can also include sending, to the UE, a request for at least a portion of the failure reports indicated as available. These exemplary methods can also include receiving at least one of the failure reports from the UE, in accordance with the request.

In various embodiments, the message, the included first indication, and/or the available failure reports can have any of the properties, characteristics, and/or features summarized above in relation to UE embodiments. In various embodiments, the request and/or the included second indication can have any of the properties, characteristics, and/or features summarized above in relation to UE embodiments. In various embodiments, the received at least one failure report can have any of the properties, characteristics, and/or features summarized above in relation to UE embodiments.

In some embodiments, these exemplary methods can also include sending, to the UE, a third indication of network interest in failure reports pertaining to one or more of the following: a network different than the first network; and a network of a different type than the first network. In various embodiments, the third indication can have any of the properties, characteristics, and/or features summarized above in relation to UE embodiments.

Other embodiments include UEs or network nodes that are configured to perform operations corresponding to any of the exemplary methods described herein. Other embodiments include non-transitory, computer-readable media storing computer-executable instructions that, when executed by processing circuitry, configure such UEs or network nodes to perform operations corresponding to any of the exemplary methods described herein.

These and other embodiments described herein can facilitate UEs to report failures occurring in a first network to a second network regardless of the respective network types. Accordingly, UEs can provide failure information in a timely manner without having to wait until connecting to a specific network or network type. Embodiments also provide networks with more failure information to use for network optimization, which can be particularly beneficial when a particular operator owns and/or manages multiple networks of different types in a single geographic area.

These and other objects, features, and advantages of the present disclosure will become apparent upon reading the following Detailed Description in view of the Drawings briefly described below.

BRIEF DESCRIPTION OF THE DRAWINGS

FIGS. 3-5 show exemplary ASN.1 data structures that define messages or information elements (IEs) used for indicating, requesting, and reporting failure information logged by a user equipment (UE).

Figure 1:
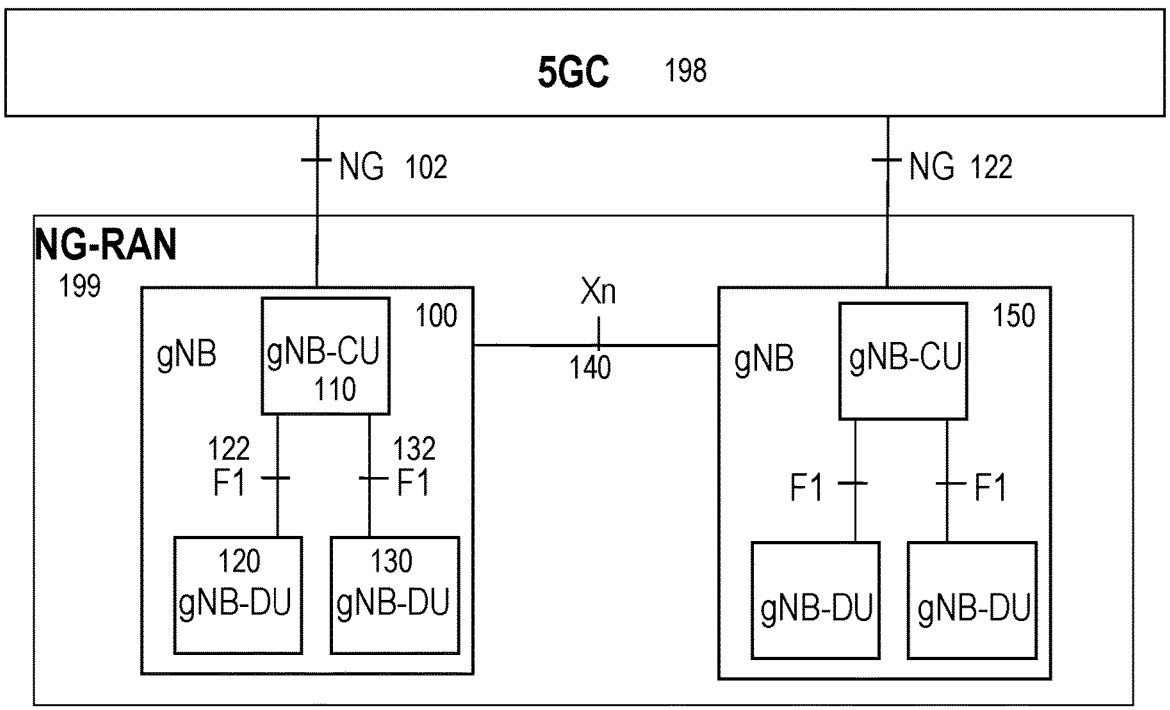
FIGS. 1-2 illustrate various aspects of an exemplary 5G network architecture.

DETAILED DESCRIPTION embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

At a high level, the 5G system (5GS) includes an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one or more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0) shall be applied.

The NG RAN logical nodes shown in FIG. 1 (and described in 3GPP TS 38.401 (v15.6.0) and 3GPP TR 38.801 (v14.0.0) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5GS (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

The services in 5GC can be stateless, such that the business logic and data context are separated. For example, the services can store their context externally in a proprietary database. This can facilitate various cloud infrastructure features like auto-scaling or auto-healing. Furthermore, 5GC services can be composed of various "service operations", which are more granular divisions of overall service functionality. The interactions between service consumers and producers can be of the type "request/response" or "subscribe/notify".

Figure 2:
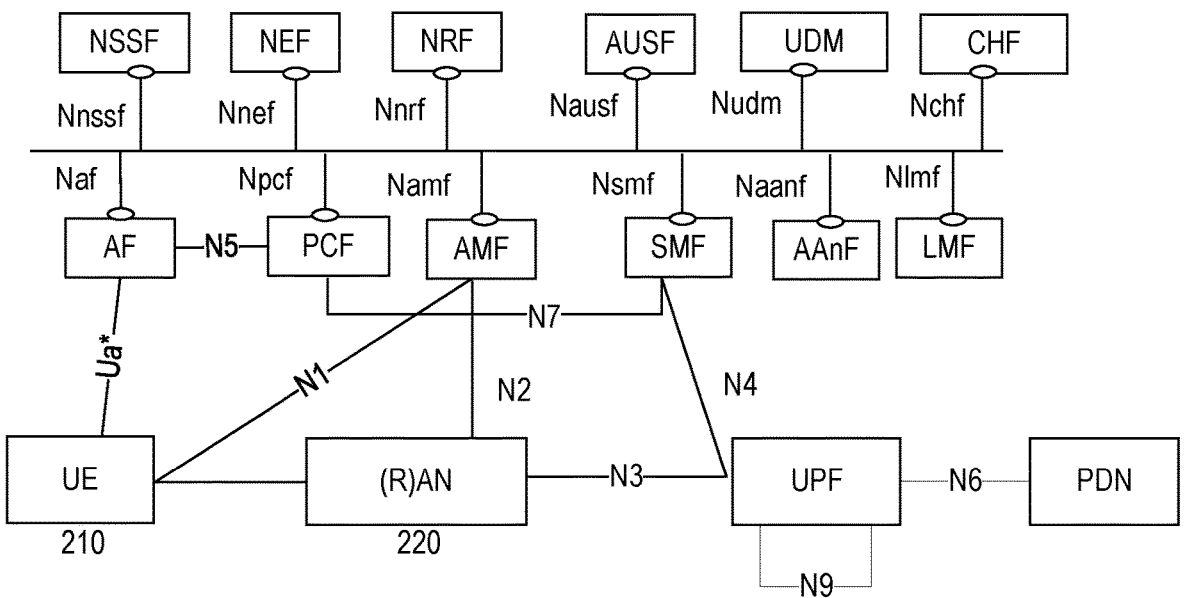

FIG. 2 shows an exemplary non-roaming 5G reference architecture with service-based interfaces and various 3GPP-defined NFs within the Control Plane (CP). In addition to a UE (210) and RAN (220), FIG. 2 shows the following NFs:

- Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.
- Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.
- User Plane Function (UPF) supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.
- Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.
- Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.
- Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.
- Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.
- Network Repository Function (NRF) with Nnrf interface—provides service registration and discovery, enabling NFs to identify appropriate services available from other NFs.
- Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.
- Authentication Server Function (AUSF) with Nausf interface—based in a user's home network (HPLMN), it performs user authentication and computes security key materials for various purposes.
- Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.
- Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

Communication between a UE and the AN (e.g., NG-RAN) is organized into various protocol layers. The radio resource control (RRC) layer controls communications between a UE and the network (e.g., serving gNB) over the radio interface, as well as the mobility of a UE between cells in the NG-RAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the CN (e.g., 5GC) and has an assigned IP address, but is not known to the serving RAN node (e.g., there is no stored context).

The NR RRC layer adds another state known as RRC_INACTIVE with properties similar to RRC_IDLE, except that the UE's context is maintained in the RAN. A UE enters RRC_INACTIVE state by a suspend procedure in RRC_CONNECTED state and returns to RRC_CONNECTED state by a resume procedure.

A network typically configures a UE in RRC_CONNECTED state to perform and report radio resource management (RRM) measurements that assist network-controlled mobility decisions such as UE handover between cells. For example, a UE may lose coverage in its current serving cell and attempt handover to a target cell. Other events may trigger other mobility-related procedures.

A radio link failure (RLF) procedure is typically triggered in the UE when something unexpected happens in any of these mobility-related procedures. The RLF procedure involves interactions between RRC and lower layer protocols such as PHY (or L1), MAC, RLC, etc. including radio link monitoring (RLM) on L1. In case of handover failure (HOF) and RLF, the UE may take autonomous actions such as selecting a cell and initiating reestablishment to remain reachable by the network. In general, a UE declares RLF only when the UE realizes that there is no reliable communication channel (or radio link) available between itself and the network, which can result in poor user experience. Also, re-establishing a connection requires signaling with a newly selected cell (e.g., random access procedure, exchanging various RRC messages, etc.), introducing latency until the UE can again reliably transmit and/or receive user data with the network.

Since RLF leads to re-establishment in a new cell and degradation of UE/network performance and end-user experience, it is in the interest of the network to understand the reasons for UE RLF and to optimize mobility-related parameters (e.g., trigger conditions of measurement reports) to reduce, minimize, and/or avoid subsequent RLFs. Before Rel-9 mobility robustness optimizations (MRO), only the UE was aware of radio quality at the time of RLF, the actual reason for declaring RLF, etc. To identify the RLF cause, the network requires more information from the UE and from the neighboring base stations (e.g., eNBs or gNBs).

In addition to physical layer issues described above, a UE can declare RLF based on any of the following events:
 upon random access problem indication from medium access control (MAC) layer;
 upon indication from radio link control (RLC) layer that a maximum number of retransmissions has been reached;
 when operating in unlicensed spectrum, upon consistent uplink listen-before-talk (LBT) failure indication from MAC layer.

Upon detecting an RLF, the UE stores the RLF report in a UE variable call varRLF-Report and retains it in memory for up to 48 hours, after which it may discard the information. When sending certain RRC messages to the network (e.g., RRCReconfigurationComplete, RRCReestablishmentComplete, RRCSetupComplete, and RRCResumeComplete), the UE can indicate it has a stored RLF report by setting a rlf-InfoAvailable field to "true". The network can request to the UE to send the report by sending a UEInformationRequest message with the rlf-ReportReq field set to "true". The UE will respond with a UEInformationResponse message that includes the indicated/requested RLF report.

FIG. 3 shows an ASN.1 data structure that defines an exemplary RRCReestablishmentComplete message for NR. Note that the rlf-InfoAvailable-r16 field is an optional field, but if present it is set to "true" indicating that one or more RLF reports are available. Its absence indicates that the UE does not have an RLF report available. In addition, the UE can also indicate that it has one or more stored reports about connection establishment failures by setting the value of connEstFailInfoAvailable-r16 to "true". The same or similar fields are included in other UE messages such as RRCReconfigurationComplete, RRCSetupComplete, and RRCResumeComplete.

FIG. 4 shows an ASN.1 data structure that defines an exemplary UEInformationRequest message for NR. Note that the rlf-ReportReq-r16 field in the UEInformationRequest-r16-IEs is an optional field, but if present it is set to "true" indicating that the network is requesting an RLF report from the UE. Its absence indicates that the network is not requesting an RLF report. A similar convention is used for the connEstFailReportReq-r16 field. In addition, the message includes fields for the network to request a random-access report (ra-ReportReq-r16), a mobility history report (mobilityHistoryReportReq-r16), and various other information.

FIG. 5 shows an ASN.1 data structure that defines an exemplary UEInformationResponse message sent by the UE in response to a UEInformationRequest message from the network. The UE can include various fields as requested by the network. Note that each report field (e.g., rlf-Report-r16, connEstFailReport-r16, etc.) is optional but if included, it contains various relevant information logged by the UE. The field rlf-Report-r16 is shown in FIG. 5 as an example. This field includes either an RLF associated with an NR serving cell (nr-RLF-Report-r16) or an octet string with various information logged by the UE for an RLF associated with an LTE serving cell (eutra-RLF-Report-r16).

As briefly mentioned above, a UE may have access to several networks or different network types (e.g., SNPN, PNI-NPN, and PLMN), which may be managed by the same or different entities. Even so, UEs are currently unable to report logged information about failures that occurred in one type of network (e.g., PLMN) to another type of network (e.g., SNPN). This can create various problems, issues, and/or difficulties for management of different networks, even if owned and/or managed by a single entity.

Embodiments of the present disclosure address these and other problems, issues, and/or difficulties by providing techniques that facilitate UE failure reporting across different networks as well as different network types. For example, embodiments facilitate UEs to report failures (e.g., RLF) that occurred in a first NPN to a second NPN (e.g., upon establishing a connection to the second NPN). Similarly, embodiments facilitate UEs to report failures that occurred in an NPN to a PLMN, and/or vice versa. In addition, embodiments facilitate UEs to report failures that occurred in an SNPN to an PNI-NPN, and/or vice versa.

Embodiments can provide various benefits and/or advantages. For example, since UEs can report failures occurring in a first network to a second network regardless of the respective network types, UEs can provide failure information in a timely manner without having to wait until connecting to a specific network or network type. Furthermore, embodiments also provide networks with more failure information to consider for network optimization, which can be particularly beneficial when a particular operator owns and/or manages multiple networks of different types in a single geographic area.

The following describes various embodiments of how a UE can indicate to a network whether failure information is available. In some embodiments a UE can indicate that failure information is not available when the UE determines that the failure information should not be sent to a particular network. In other words, even if relevant failure information is available in the UE, the UE indicates to the particular network that it is not available due to a restriction on sending failure information to the particular network. Note that a UE sending "failure information" (e.g., as illustrated in FIG. 5) is distinct from the UE sending "an indication of failure information availability" (e.g., as illustrated in FIG. 3).

The following describes various scenarios in which a UE is "connected to an NPN" or has experienced a failure when connected to a cell associated with an NPN, etc. In such scenarios, the UE has been connected to a cell that broadcasts an identifier of that NPN, e.g., an SNPN with NID or a PNI-NPN with CAG. For PNI-NPNs, this is equivalent to the UE being connected to a cell that advertises (i.e., broadcasts) a CAG with which the UE is associated, implying the UE has access to that cell.

In some embodiments, if a failure occurred while a UE was connected to a first NPN, the UE can indicate availability of a corresponding failure report to a second NPN (i.e., different from the first NPN). These embodiments can also be referred to as "cross-NPN failure reporting." For example, the UE may experience a failure when connected to a first SNPN (or PNI-NPN) and the UE later connects to a second SNPN (or PNI-NPN). In such case, the UE would report failure information when connected to a cell associated with the second SNPN (or PNI-NPN).

In some embodiments, certain conditions may need to be met for the UE to perform cross-NPN failure reporting. Example conditions include:
  first NPN and second NPN are considered equivalent; or
  first NPN and second NPN share a common identifier, e.g., associated with the same PLMN ID. An exception to this condition is that both first and second NPNs share a special PLMN ID (i.e., one that is not normally used, invalid, etc.).

In some embodiments, if a failure occurred while a UE was connected to a first NPN, the UE can indicate availability of a corresponding failure report to a PLMN. Likewise, if a failure occurred while a UE was connected to the PLMN, the UE can indicate availability of a corresponding failure report to the first NPN. The UE can act in this manner even if the PLMN and the first NPN are different network types. Similarly, in some embodiments, if a failure occurred while a UE was connected to a first NPN of a first type (e.g., SNPN), the UE can indicate availability of a corresponding failure report to a second NPN of a second type (e.g., PNI-NPN). These various embodiments can also be referred to as "cross-network type failure reporting."

In some embodiments, certain conditions may need to be met for the UE to perform cross-network type failure reporting. An example condition is that PLMN IDs of the two networks of different types are the same, such that a UE would only do cross-network type reporting if a first PLMN ID is used by both networks. As a more specific example, if a failure occurred while the UE was connected to a first SNPN that uses the first PLMN ID, the UE would report the failure information in a cell of a first PLMN that uses the first PLMN ID, but not in a cell of a second PLMN that uses a second PLMN ID (e.g., different from the first PLMN ID).

That the first SNPN and the first PLMN use the same first PLMN ID implies some coordination between these networks, such that the failure report would be useful to the first PLMN. In contrast, the second PLMN ID implies no such coordination between the first SNPN and the second PLMN, such that the failure report would not be useful to the second PLMN.

In some embodiments, when the UE indicates availability of failure information, the UE can indicate whether the failure occurred in another network (e.g., another SNPN or PNI-NPN) or in the current network (e.g., that provides the UE's current serving cell). The following are some example implementations:
  a two-valued variable, where a first value indicates the failure occurred in the current network and the second value indicates the failure occurred in a different network; or
  a single-valued variable, where presence indicates the failure occurred in a different network and absence indicates the failure occurred in the same network.

In some embodiments, when the UE indicates availability of failure information, the UE can indicate whether the failure occurred in a network of the same or a different type as the current network (e.g., that provides the UE's current serving cell). The following are some example implementations:
  a two-valued variable, where a first value indicates the failure occurred in the same type of network and the second value indicates the failure occurred in a different type of network;
  a single-valued variable, where presence indicates the failure occurred in a different type of network and absence indicates the failure occurred in the same type of network; or
  a multi-valued variable, where each value is associated with a particular type of network (e.g., PLMN, SNPN, PNI-NPN) in which the failure occurred.

In other embodiments, the UE can include an identifier of the network in which the failure occurred. For example, the included identifier can be PLMN ID+NID (for SNPN), PLMN ID+CAG (for PNI-NPN), or PLMN ID (for PLMN). These embodiments can be used separately from or in combination with the embodiments described above. For example, if the UE indicates that the failure occurred in a different network, the UE can include a network identifier. On the other hand, if the UE indicates that the failure occurred in the same network, the UE can refrain from including the network identifier.

The various embodiments above can be realized by modifications and/or additions to various messages currently sent by the UE, such as the RRCReestablishmentComplete message shown in FIG. 3.

In some embodiments, the network can consider received availability indications according to any of the above embodiments when determining whether to request failure reports from a UE. For example, the network can request a UE to report on failures that occurred in that network, but refrain from requesting a UE to report on failures that occurred in a different network and/or in a different network type. As another example, the network can request a UE to report on all failures regardless of network or network type, if such information would be useful for the network's ongoing tuning and/or optimization procedures. The following are some example implementations:

a two-valued variable, where a first value indicates reports are requested only for failures in the current network and a second value indicates reports are requested for all failures regardless of network or network type.

a multi-valued variable, where a first value indicates reports are requested only for failures in the current network, a second value indicates reports are requested for the current network and a first type of network (e.g., PLMN), a third value indicates reports are requested for the current network and a second type of network (e.g., PNI-NPN), etc.

a multi-valued variable, where each value is associated with a particular type of network (e.g., PLMN, SNPN, PNI-NPN) for which failure reports are requested.

a list of PLMN IDs for which failure reports are requested.

The various embodiments above can be realized by modifications and/or additions to the UEInformationRequest message currently sent by the network node, such as shown in FIG. 4. Upon receiving a request for failure reports according to any of the above embodiments, the UE can respond with the appropriate failure reports. For example, the UE can send a UEInformationResponse message, such as shown in FIG. 5, modified according to any of the above embodiments. In general, however, it is expected that the network will not request the UE to provide failure reports other than those for which the UE has indicated availability.

In some embodiments, the network can indicate to UEs (e.g., via broadcast signaling in each cell) whether the network is interested in UE cross-network and/or cross-network type failure reporting. UEs can selectively indicate availability of cross-network and/or cross-network type failure reports based on this indication received from the network. In other words, if the network indicates that it is interested in cross-network failure reporting but not cross-network type failure reporting, the UE may indicate availability of cross-network failure reports but refrain from indicating availability of cross-network type failure reports, even if such are available at the UE.

In other embodiments, the network can indicate to UEs (e.g., via broadcast signaling in each cell) the particular networks and/or network types for which it is interested in failure reporting. For example, the network may indicate that it wants cross-network reporting for a first NPN (e.g., with a first PLMN ID) and the UE can indicate availability of information associated with a failure in the first NPN but refrain from indicating availability of information associated with a failure in a second NPN.

Figure 6:
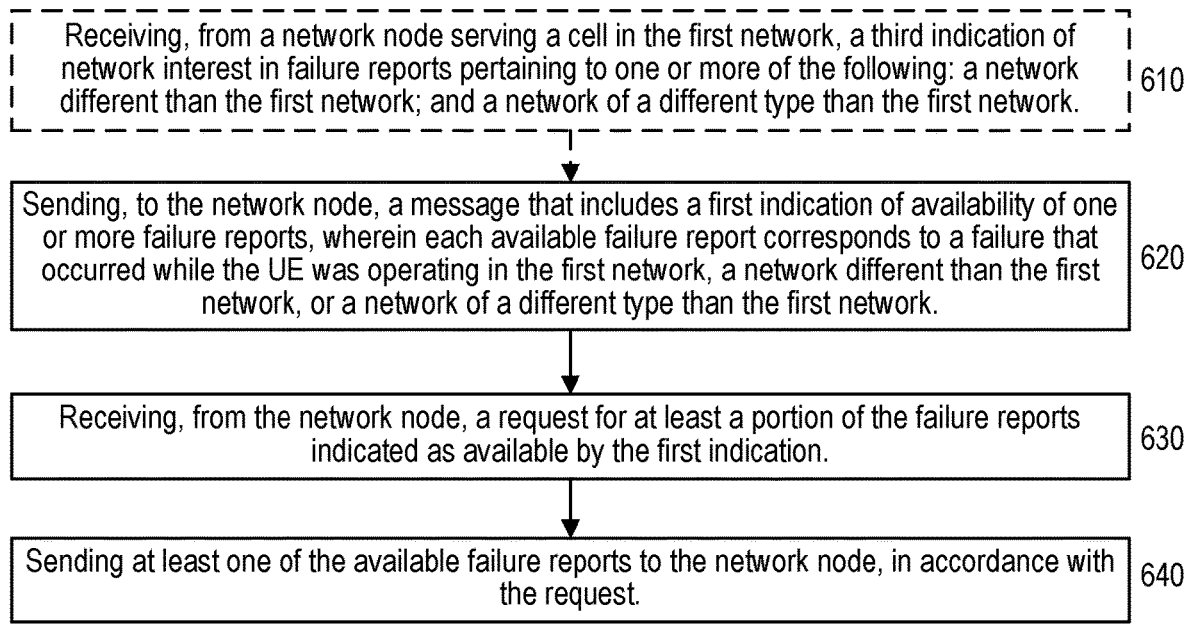
FIG. 6 illustrates an exemplary method (e.g., procedure) for a user equipment (UE, e.g., wireless device), according to various exemplary embodiments of the present disclosure.
Figure 7:
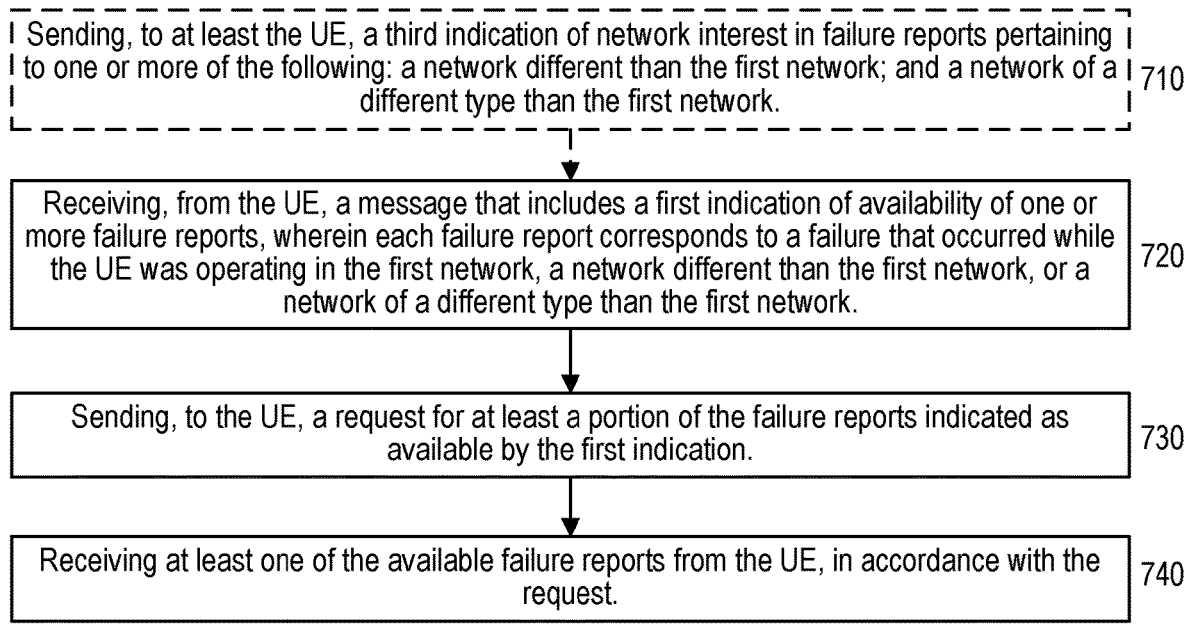
FIG. 7 illustrates an exemplary method (e.g., procedure) for a network node (e.g., base station, eNB, gNB, ng-eNB, en-gNB, etc.) serving a cell in a first network (e.g., PLMN, SNPN, PNI-NPN), according to various exemplary embodiments of the present disclosure.

The embodiments described above can be further illustrated with reference to FIGS. 6-7, which depict exemplary methods (e.g., procedures) performed by a UE and a network node, respectively. Put differently, various features of the operations described below correspond to various embodiments described above. The exemplary methods shown in FIGS. 6-7 can be complementary to each other such that they can be used cooperatively to provide benefits, advantages, and/or solutions to problems described herein. Although the exemplary methods are illustrated in FIGS. 6-7 by specific blocks in particular orders, the operations corresponding to the blocks can be performed in different orders than shown and can be combined and/or divided into operations having different functionality than shown. Optional blocks and/or operations are indicated by dashed lines.

More specifically, FIG. 6 illustrates an exemplary method (e.g., procedure) for failure reporting by a user equipment (UE) operating in a cell of a first network, according to various exemplary embodiments of the present disclosure.

The exemplary method can be performed by a UE (e.g., wireless device), such as UEs described elsewhere herein.

The exemplary method can include the operations of block 620, where the UE can send, to a network node serving the cell, a message that includes a first indication of availability of one or more failure reports. Each failure report corresponds to a failure that occurred while the UE was operating in the first network, a network different than the first network, or a network of a different type than the first network. The exemplary method can also include the operations of block 630, where the UE can receive, from the network node, a request for at least a portion of the failure reports indicated as available by the first indication. The exemplary method can also include the operations of block 640, where the UE can send at least one of the available failure reports to the network node, in accordance with the request.

In some embodiments, for each available failure report, the first indication can indicate whether the corresponding failure occurred while the UE was operating in the first network, a network different than the first network, or a network of a different type than the first network.

In some embodiments, for each available failure report, the first indication is one of the following:

a first variable that can take on at least first and second values, wherein the first value indicates the corresponding failure occurred while the UE was operating in the first network and the second value indicates the corresponding failure occurred while the UE was operating in a network different than the first network; or presence or absence of a second variable, where presence indicates the corresponding failure occurred while the UE was operating in the first network and absence indicates the corresponding failure occurred while the UE was operating in a network different than the first network. An opposite convention is also possible.

In other of these embodiments, for each available failure report, the first indication is one of the following:

a first variable that can take on at least first and second values, wherein the first value indicates the corresponding failure occurred while the UE was operating in the first network and the second value indicates the corresponding failure occurred while the UE was operating in a network of a different type than the first network;

presence or absence of a second variable, wherein presence indicates the corresponding failure occurred while the UE was operating in the first network and absence indicates the corresponding failure occurred while the UE was operating in a network of a different type than the first network (an opposite convention is also possible); or a third variable that can take on a plurality of values, wherein each value is associated with a particular type of network in which the corresponding failure occurred.

In some embodiments, the respective values for the third variable can be associated with the following respective types: public land mobile network (PLMN); standalone non-public network (SNPN); and public network integrated NPN (PNI-NPN).

In some embodiments, the one or more failure reports (e.g., indicated as available in block 620) can include a second failure report corresponding to a second failure that occurred while the UE was operating in a second network. In various embodiments, one of the following applies:

the first network is PLMN and the second network is an NPN;

the first network is an NPN and the second network is a PLMN; or the first network is a first NPN and the second network is a second NPN.

In some embodiments, for each available failure report that corresponds to a failure that occurred while the UE was operating in a network different than the first network, the first indication can include an identifier of the network (e.g., PLMN ID) in which the corresponding failure occurred.

In some embodiments, the request (e.g., received in block 630) can include a second indication that available failure reports are requested for UE failures that occurred in one of the following:

only the first network;
all networks;
one or more particular networks; or
one or more particular types of networks.

In some of these embodiments, the one or more particular networks can be indicated by respective PLMN IDs. In some of these embodiments, the at least one failure report (e.g., sent in block 640) can include:

a first failure report corresponding to a UE failure that occurred in an NPN associated with a first PLMN ID; and a second failure report corresponding to a UE failure that occurred in a PLMN associated with the first PLMN ID.

In some embodiments, the exemplary method can also include the operations of block 610, where the UE can receive, from the network node, a third indication of network interest in failure reports pertaining to one or more of the following: a network different than the first network; and a network of a different type than the first network.

In some of these embodiments, when the third indication (e.g., received in block 610) indicates no network interest in failure reports pertaining to a network different than the first network, the first indication (e.g., sent in block 620) does not indicate availability of failure reports corresponding to failures that occurred while the UE was operating in a network different than the first network, even when such failure reports are available at the UE.

In other of these embodiments, when the third indication (e.g., received in block 610) indicates no network interest in failure reports pertaining to a network of a different type than the first network, the first indication (e.g., sent in block 620) does not indicate availability of failure reports corresponding to failures that occurred while the UE was operating in a network of a different type than the first network, even when such failure reports are available at the UE.

In addition, FIG. 7 illustrates an exemplary method (e.g., procedure) for receiving failure reports by a UE operating in a cell in a first network, according to various exemplary embodiments of the present disclosure. The exemplary method can be performed by a network node (e.g., base station, eNB, gNB, ng-eNB, en-gNB, etc.) serving the cell in the first network (e.g., PLMN, SNPN, PNI-NPN), such as a network node described elsewhere herein.

The exemplary method can include the operations of block 720, where the network node can receive, from the UE, a message that includes a first indication of availability of one or more failure reports. Each failure report corresponds to a failure that occurred while the UE was operating in the first network, a network different than the first network, or a network of a different type than the first network. The exemplary method can also include the operations of block 730, where the network node can send, to the UE, a request for at least a portion of the failure reports indicated as available by the first indication. The exemplary method can also include the operation of block 740, where the network node can receive at least one of the available failure reports from the UE, in accordance with the request.

In some embodiments, for each available failure report, the first indication can indicate whether the corresponding failure occurred while the UE was operating in the first network, a network different than the first network, or a network of a different type than the first network.

In some of these embodiments, for each available failure report, the first indication is one of the following:

a first variable that can take on at least first and second values, wherein the first value indicates the corresponding failure occurred while the UE was operating in the first network and the second value indicates the corresponding failure occurred while the UE was operating in a network different than the first network; or presence or absence of a second variable, where presence indicates the corresponding failure occurred while the UE was operating in the first network and absence indicates the corresponding failure occurred while the UE was operating in a network different than the first network. An opposite convention is also possible.

In other of these embodiments, for each available failure report, the first indication is one of the following:

a first variable that can take on at least first and second values, wherein the first value indicates the corresponding failure occurred while the UE was operating in the first network and the second value indicates the corresponding failure occurred while the UE was operating in a network of a different type than the first network;

presence or absence of a second variable, wherein presence indicates the corresponding failure occurred while the UE was operating in the first network and absence indicates the corresponding failure occurred while the UE was operating in a network of a different type than the first network (an opposite convention is also possible); or a third variable that can take on a plurality of values, wherein each value is associated with a particular type of network in which the corresponding failure occurred.

In some embodiments, the respective values for the third variable can be associated with the following respective types: PLMN, SNPN, and PNI-NPN.

In some embodiments, the one or more failure reports (e.g., indicated as available in block 720) can include a second failure report corresponding to a second failure that occurred while the UE was operating in a second network. In various embodiments, one of the following applies:

the first network is a public land mobile network (PLMN) and the second network is a non-public network (NPN);
the first network is an NPN and the second network is a PLMN; or
the first network is a first NPN and the second network is a second NPN.

In some embodiments, for each available failure report that corresponds to a failure that occurred while the UE was operating in a network different than the first network, the first indication can include an identifier of the network (e.g., PLMN ID) in which the corresponding failure occurred.

In some embodiments, the request (e.g., sent in block 730) can include a second indication that available failure reports are requested for UE failures that occurred in one of the following:

only the first network;
all networks;

one or more particular networks; or one or more particular types of networks.

In some of these embodiments, the one or more particular networks can be indicated by respective PLMN IDs. In some of these embodiments, the at least one failure report (e.g., received in block 740) can include:

a first failure report corresponding to a UE failure that occurred in an NPN associated with a first PLMN ID; and a second failure report corresponding to a UE failure that occurred in a PLMN associated with the first PLMN ID.

In some embodiments, the exemplary method can also include the operations of block 710, where the network node can send, to the UE, a third indication of network interest in failure reports pertaining to one or more of the following: a network different than the first network; and a network of a different type than the first network.

In some of these embodiments, when the third indication (e.g., sent in block 710) indicates no network interest in failure reports pertaining to a network different than the first network, the first indication (e.g., received in block 720) does not indicate availability of failure reports corresponding to failures that occurred while the UE was operating in a network different than the first network, even when such failure reports are available at the UE.

In some of these embodiments, when the third indication (e.g., sent in block 710) indicates no network interest in failure reports pertaining to a network of a different type than the first network, the first indication (e.g., received in block 720) does not indicate availability of failure reports corresponding to failures that occurred while the UE was operating in a network of a different type than the first network, even when such failure reports are available at the UE.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 8:
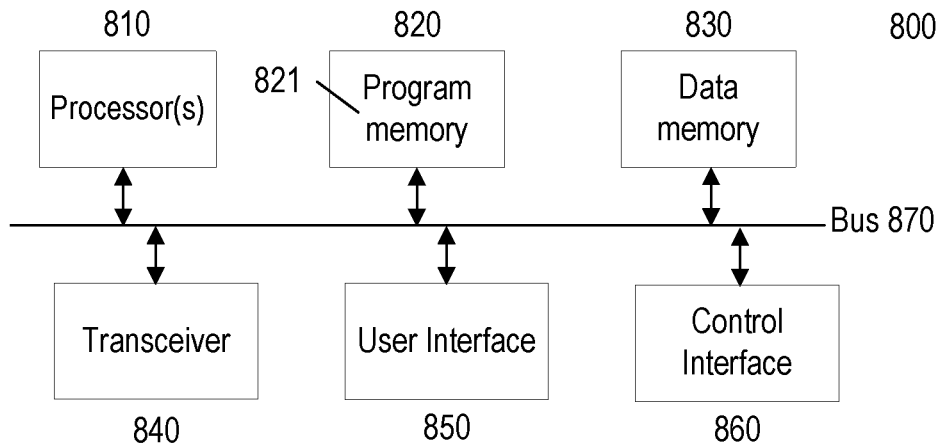
FIG. 8 shows a block diagram of an exemplary wireless device or UE, according to various exemplary embodiments of the present disclosure.

FIG. 8 shows a block diagram of an exemplary wireless device or user equipment (UE) 800 (hereinafter referred to as "UE 800") according to various embodiments of the present disclosure, including those described above with reference to other figures. For example, UE 800 can be configured by execution of instructions, stored on a computer-readable medium, to perform operations corresponding to one or more of the exemplary methods and/or procedures described above.

UE 800 can include a processor 810 (also referred to as "processing circuitry") that can be operably connected to a program memory 820 and/or a data memory 830 via a bus 870 that can comprise parallel address and data buses, serial ports, or other methods and/or structures known to those of ordinary skill in the art. Program memory 820 can store software code, programs, and/or instructions (collectively shown as computer program product 821 in FIG. 8) that, when executed by processor 810, can configure and/or facilitate UE 800 to perform various operations, including operations described below. For example, execution of such instructions can configure and/or facilitate UE 800 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 840, user interface 850, and/or control interface 860.

As another example, processor 810 can execute program code stored in program memory 820 that corresponds to MAC, RLC, PDCP, and RRC layer protocols standardized by 3GPP (e.g., for NR and/or LTE). As a further example, processor 810 can execute program code stored in program memory 820 that, together with radio transceiver 840, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 810 can execute program code stored in program memory 820 that, together with radio transceiver 840, implements device-to-device (D2D) communications with other compatible devices and/or UEs.

Program memory 820 can also include software code executed by processor 810 to control the functions of UE 800, including configuring and controlling various components such as radio transceiver 840, user interface 850, and/or host interface 860. Program memory 820 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 820 can comprise an external storage arrangement (not shown) remote from UE 800, from which the instructions can be downloaded into program memory 820 located within or removably coupled to UE 800, so as to enable execution of such instructions.

Data memory 830 can include memory area for processor 810 to store variables used in protocols, configuration, control, and other functions of UE 800, including operations corresponding to, or comprising, any of the exemplary methods and/or procedures described herein. Moreover, program memory 820 and/or data memory 830 can include non-volatile memory (e.g., flash memory), volatile memory (e.g., static or dynamic RAM), or a combination thereof. Furthermore, data memory 830 can comprise a memory slot by which removable memory cards in one or more formats (e.g., SD Card, Memory Stick, Compact Flash, etc.) can be inserted and removed.

Persons of ordinary skill will recognize that processor 810 can include multiple individual processors (including, e.g., multi-core processors), each of which implements a portion of the functionality described above. In such cases, multiple individual processors can be commonly connected to program memory 820 and data memory 830 or individually connected to multiple individual program memories and or data memories. More generally, persons of ordinary skill in the art will recognize that various protocols and other functions of UE 800 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 840 can include radio-frequency transmitter and/or receiver functionality that facilitates the UE 800 to communicate with other equipment supporting like wireless communication standards and/or protocols. In some exemplary embodiments, the radio transceiver 840 includes one or more transmitters and one or more receivers that enable UE 800 to communicate according to various protocols and/or methods proposed for standardization by 3GPP and/or other standards bodies. For example, such functionality can operate cooperatively with processor 810 to implement a PHY layer based on OFDM, OFDMA, and/or SC-FDMA technologies, such as described herein with respect to other figures.

In some exemplary embodiments, radio transceiver 840 includes one or more transmitters and one or more receivers that can facilitate the UE 800 to communicate with various LTE, LTE-Advanced (LTE-A), and/or NR networks according to standards promulgated by 3GPP. In some exemplary embodiments of the present disclosure, the radio transceiver 840 includes circuitry, firmware, etc. necessary for the UE 800 to communicate with various NR, NR-U, LTE, LTE-A, LTE-LAA, UMTS, and/or GSM/EDGE networks, also according to 3GPP standards. In some embodiments, radio transceiver 840 can include circuitry supporting D2D communications between UE 800 and other compatible devices.

In some embodiments, radio transceiver 840 includes circuitry, firmware, etc. necessary for the UE 800 to communicate with various CDMA2000 networks, according to 3GPP2 standards. In some embodiments, the radio transceiver 840 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 840 can include a transceiver that is capable of wired communication, such as by using IEEE 802.3 Ethernet technology. The functionality particular to each of these embodiments can be coupled with and/or controlled by other circuitry in the UE 800, such as the processor 810 executing program code stored in program memory 820 in conjunction with, and/or supported by, data memory 830.

User interface 850 can take various forms depending on the particular embodiment of UE 800, or can be absent from UE 800 entirely. In some embodiments, user interface 850 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 800 can comprise a tablet computing device including a larger touchscreen display. In such embodiments, one or more of the mechanical features of the user interface 850 can be replaced by comparable or functionally equivalent virtual user interface features (e.g., virtual keypad, virtual buttons, etc.) implemented using the touchscreen display, as familiar to persons of ordinary skill in the art. In other embodiments, the UE 800 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 800 having a touch screen display are capable of receiving user inputs, such as inputs related to exemplary methods and/or procedures described herein or otherwise known to persons of ordinary skill in the art.

In some embodiments, UE 800 can include an orientation sensor, which can be used in various ways by features and functions of UE 800. For example, the UE 800 can use outputs of the orientation sensor to determine when a user has changed the physical orientation of the UE 800's touch screen display. An indication signal from the orientation sensor can be available to any application program executing on the UE 800, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 860 of the UE 800 can take various forms depending on the particular exemplary embodiment of UE 800 and of the particular interface requirements of other devices that the UE 800 is intended to communicate with and/or control. For example, the control interface 860 can comprise an RS-232 interface, a USB interface, an HDMI interface, a Bluetooth interface, an IEEE ("Firewire") interface, an I2C interface, a PCMCIA interface, or the like. In some exemplary embodiments of the present disclosure, control interface 860 can comprise an IEEE 802.3 Ethernet interface such as described above. In some exemplary embodiments of the present disclosure, the control interface 860 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 800 can comprise more functionality than is shown in FIG. 8 including, for example, a video and/or still-image camera, microphone, media player and/or recorder, etc. Moreover, radio transceiver 840 can include circuitry necessary to communicate using additional radio-frequency communication standards including Bluetooth, GPS, and/or others. Moreover, the processor 810 can execute software code stored in the program memory 820 to control such additional functionality. For example, directional velocity and/or position estimates output from a GPS receiver can be available to any application program executing on the UE 800, including various exemplary methods and/or computer-readable media according to various exemplary embodiments of the present disclosure.

Figure 9:
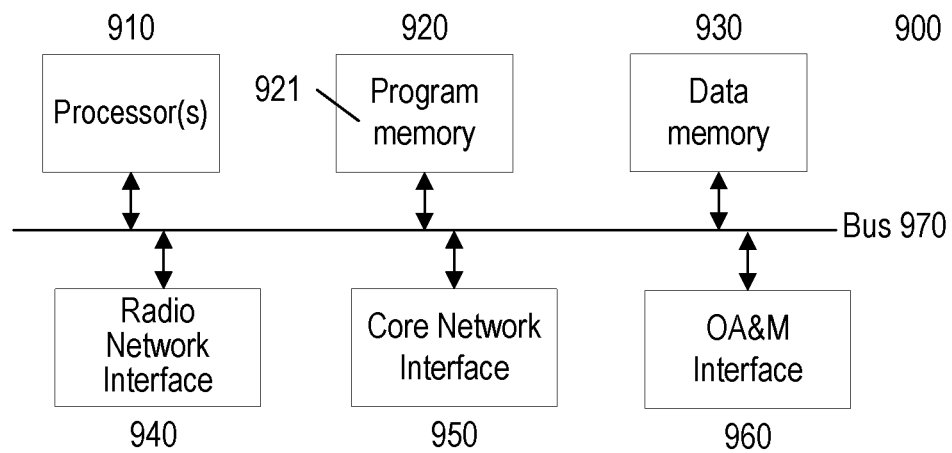
FIG. 9 shows a block diagram of an exemplary network node, according to various exemplary embodiments of the present disclosure.

FIG. 9 shows a block diagram of an exemplary network node 900 according to various embodiments of the present disclosure, including those described above with reference to other figures. For example, exemplary network node 900 can be configured by execution of instructions, stored on a computer-readable medium, to perform operations corresponding to one or more of the exemplary methods and/or procedures described above. In some exemplary embodiments, network node 900 can comprise a base station, eNB, gNB, or one or more components thereof. For example, network node 900 can be configured as a central unit (CU) and one or more distributed units (DUs) according to NR gNB architectures specified by 3GPP. More generally, the functionally of network node 900 can be distributed across various physical devices and/or functional units, modules, etc.

Network node 900 can include processor 910 (also referred to as "processing circuitry") that is operably connected to program memory 920 and data memory 930 via bus 970, which can include parallel address and data buses, serial ports, or other methods and/or structures known to those of ordinary skill in the art.

Program memory 920 can store software code, programs, and/or instructions (collectively shown as computer program product 921 in FIG. 9) that, when executed by processor 910, can configure and/or facilitate network node 900 to perform various operations. For example, execution of such stored instructions can configure network node 900 to communicate with one or more other devices using protocols according to various embodiments of the present disclosure, including one or more exemplary methods and/or procedures discussed above. Program memory 920 can also comprise software code executed by processor 910 that can facilitate and specifically configure network node 900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 940 and core network interface 950. By way of example and without limitation, core network interface 950 can comprise the S1 interface and radio network interface 940 can comprise the Uu interface, as standardized by 3GPP. Program memory 920 can further comprise software code executed by processor 910 to control the functions of network node 900, including configuring and controlling various components such as radio network interface 940 and core network interface 950.

Data memory 930 can comprise memory area for processor 910 to store variables used in protocols, configuration, control, and other functions of network node 900. As such, program memory 920 and data memory 930 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 910 can include multiple individual processors (not shown), each of which implements a portion of the functionality described above. In such case, multiple individual processors may be commonly connected to program memory 920 and data memory 930 or individually connected to multiple individual program memories and/or data memories. More generally, persons of ordinary skill will recognize that various protocols and other functions of network node 900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 940 can comprise transmitters, receivers, signal processors, ASICs, antennas, beamforming units, and other circuitry that enables network node 900 to communicate with other equipment such as, in some embodiments, a plurality of compatible user equipment (UE). In some embodiments, interface 940 can also enable network node 900 to communicate with compatible satellites of a satellite communication network. In some exemplary embodiments, radio network interface 940 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 940. According to further exemplary embodiments of the present disclosure, the radio network interface 940 can comprise a PHY layer based on OFDM, OFDMA, and/or SC-FDMA technologies. In some embodiments, the functionality of such a PHY layer can be provided cooperatively by radio network interface 940 and processor 910 (including program code in memory 920).

Core network interface 950 can comprise transmitters, receivers, and other circuitry that enables network node 900 to communicate with other equipment in a core network such as, in some embodiments, circuit-switched (CS) and/or packet-switched Core (PS) networks. In some embodiments, core network interface 950 can comprise the S1 interface standardized by 3GPP. In some embodiments, core network interface 950 can comprise the NG interface standardized by 3GPP. In some exemplary embodiments, core network interface 950 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 950 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 900 can include hardware and/or software that configures and/or facilitates network node 900 to communicate with other network nodes in a RAN, such as with other eNBs, gNBs, ng-eNBs, en-gNBs, IAB nodes, etc. Such hardware and/or software can be part of radio network interface 940 and/or core network interface 950, or it can be a separate functional unit (not shown). For example, such hardware and/or software can configure and/or facilitate network node 900 to communicate with other RAN nodes via the X2 or Xn interfaces, as standardized by 3GPP.

OA&M interface 960 can comprise transmitters, receivers, and other circuitry that enables network node 900 to communicate with external networks, computers, databases, and the like for purposes of operations, administration, and maintenance of network node 900 or other network equipment operably connected thereto. Lower layers of OA&M interface 960 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some to embodiments, one or more of radio network interface 940, core network interface 950, and OA&M interface 960 may be multiplexed together on a single physical interface, such as the examples listed above.

Figure 10:
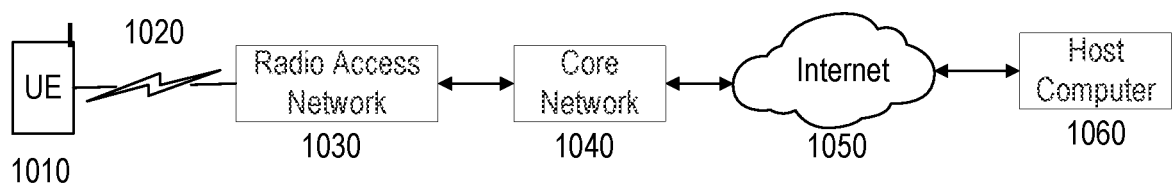
FIG. 10 shows a block diagram of an exemplary network configured to provide over-the-top (OTT) data services between a host computer and a UE, according to various exemplary embodiments of the present disclosure.

FIG. 10 is a block diagram of an exemplary communication network configured to provide over-the-top (OTT) data services between a host computer and a user equipment (UE), according to one or more exemplary embodiments of the present disclosure. UE 1010 can communicate with radio access network (RAN) 1030 over radio interface 1020, which can be based on protocols described above including, e.g., LTE, LTE-A, and 5G/NR. For example, UE 1010 can be configured and/or arranged as shown in other figures discussed above.

RAN 1030 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1030 can cooperatively operate using licensed and unlicensed spectrum. In some embodiments, RAN 1030 can include, or be capable of communication with, one or more satellites comprising a satellite access network.

RAN 1030 can further communicate with core network 1040 according to various protocols and interfaces described above. For example, one or more apparatus (e.g., base stations, eNBs, gNBs, etc.) comprising RAN 1030 can communicate to core network 1040 via core network interface 1650 described above. In some exemplary embodiments, RAN 1030 and core network 1040 can be configured and/or arranged as shown in other figures discussed above. For example, eNBs comprising an E-UTRAN 1030 can communicate with an EPC core network 1040 via an S1 interface, such as shown in FIG. 1. As another example, gNBs comprising a NR RAN 1030 can communicate with a 5GC core network 1030 via an NG interface.

Core network 1040 can further communicate with an external packet data network, illustrated in FIG. 10 as Internet 1050, according to various protocols and interfaces known to persons of ordinary skill in the art. Many other devices and/or networks can also connect to and communicate via Internet 1050, such as exemplary host computer 1060. In some exemplary embodiments, host computer 1060 can communicate with UE 1010 using Internet 1050, core network 1040, and RAN 1030 as intermediaries. Host computer 1060 can be a server (e.g., an application server) under ownership and/or control of a service provider. Host computer 1060 can be operated by the OTT service provider or by another entity on the service provider's behalf.

For example, host computer 1060 can provide an over-the-top (OTT) packet data service to UE 1010 using facilities of core network 1040 and RAN 1030, which can be unaware of the routing of an outgoing/incoming communication to/from host computer 1060. Similarly, host computer 1060 can be unaware of routing of a transmission from the host computer to the UE, e.g., the routing of the transmission through RAN 1030. Various OTT services can be provided using the exemplary configuration shown in FIG. 10 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 10 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Embodiments described herein can facilitate UEs to report failures occurring in a first network to a second network regardless of the respective network types. Accordingly, UEs can provide failure information in a timely manner without having to wait until connecting to a specific network or network type. Embodiments also provide networks with more failure information to use for network optimization, which can be particularly beneficial when a particular operator owns and/or manages multiple networks of different types in a single geographic area. When used in UEs (e.g., UE 1010) and network nodes (e.g., eNBs or gNBs comprising RAN 1030), embodiments described herein can provide and/or facilitate improved network performance such as more consistent data throughput and/or fewer service interruptions. These performance improvements can increase the value of OTT services delivered over the network to both end users and providers of such services.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein include, but are not limited to, the following enumerated examples:

A1. A method for failure reporting by a user equipment (UE) operating in a cell of a first network, the method comprising:
- sending, to a network node serving the cell, a message that includes a first indication of availability of one or more failure reports, wherein each failure report corresponds to a failure that occurred while the UE was operating in:
  - the first network;
  - a network different than the first network; or
  - a network of a different type than the first network;
- receiving, from the network node, a request for at least a portion of the failure reports indicated as available; and
- sending at least one of the failure reports to the network node, in accordance with the request.

A2. The method of embodiment A1, wherein for each particular failure report, the first indication indicates whether the corresponding failure occurred while the UE was operating in:
- the first network;
- a network different than the first network; or
- a network of a different type than the first network.

A3. The method of any of embodiments A1-A2, wherein for each particular failure report, the first indication is one of the following:
- a first variable, wherein a first value indicates the corresponding failure occurred while the UE was operating in the first network and a second value indicates the corresponding failure occurred while the UE was operating in a network different than the first network and absence indicates the corresponding failure occurred while the UE was operating in a network different than the first network.

A4. The method of any of embodiments A1-A2, wherein for each particular failure report, the first indication is one of the following:
- a first variable, wherein a first value indicates the corresponding failure occurred while the UE was operating in the first network and a second value indicates the corresponding failure occurred while the UE was operating in a network of a different type than the first network;
- presence or absence of a second variable, wherein presence indicates the corresponding failure occurred while the UE was operating in the first network and absence indicates the corresponding failure occurred while the UE was operating in a network of a different type than the first network; or
- a third variable, wherein each value is associated with a particular type of network in which the corresponding failure occurred.

A5. The method of embodiment A4, wherein the respective values for the third variable are associated with the following respective types:
- public land mobile network (PLMN);
- standalone non-public network (SNPN); and
- public network integrated NPN (PNI-NPN).

A6. The method of any of embodiments A2-A5, wherein:
- the one or more failure reports include a second failure report corresponding to a second failure that occurred while the UE was operating in a second network; and
- one of the following applies:
  - the first network is a public land mobile network (PLMN) and the second network is a non-public network (NPN);
  - the first network is an NPN and the second network is a PLMN; or
  - the first network is a first NPN and the second network is a second NPN.

A7. The method of embodiment A2, wherein for each particular failure report, when the first indication indicates that the corresponding failure occurred while the UE was not operating in the first network, the message also includes an identifier of the network in which the corresponding failure occurred.

A8. The method of any of embodiments A1-A7, wherein the request includes a second indication that available failure reports are requested for UE failures that occurred in one of the following:
- only the first network;
- all networks;
- one or more particular networks; or
- one or more particular types of networks.

A9. The method of embodiment A8, wherein the one or more particular networks are indicated by respective public land mobile network identities (PLMN IDs).

A10. The method of embodiment A9, wherein the at least one failure report includes:
- a first failure report corresponding to a UE failure that occurred in a non-public network (NPN) associated with a first PLMN ID; and
- a second failure report corresponding to a UE failure that occurred in a PLMN associated with the first PLMN ID.

A11. The method of any of embodiments A1-A10, further comprising receiving, from the network node, a third indication of network interest in failure reports pertaining to one or more of the following:
a network different than the first network; and
a network of a different type than the first network.

A12. The method of embodiment A11, wherein when the third indication indicates no network interest in failure reports pertaining to a network different than the first network, the first indication does not indicate availability of failure reports corresponding to failures that occurred while the UE was operating in a network different than the first network, even if such failure reports are available at the UE.

A13. The method of embodiment A11, wherein when the third indication indicates no network interest in failure reports pertaining to a network of a different type than the first network, the first indication does not indicate availability of failure reports corresponding to failures that occurred while the UE was operating in a network of a different type than the first network, even if such failure reports are available at the UE.

B1. A method, by a network node serving a cell in a first network, for receiving failure reports by a user equipment (UE) operating in the cell, the method comprising:
receiving, from the UE, a message that includes a first indication of availability of one or more failure reports, wherein each failure report corresponds to a failure that occurred while the UE was operating in:
the first network;
a network different than the first network; or
a network of a different type than the first network;
sending, to the UE, a request for at least a portion of the failure reports indicated as available; and
receiving at least one of the failure reports from the UE, in accordance with the request.

B2. The method of embodiment B1, wherein for each particular failure report, the first indication indicates whether the corresponding failure occurred while the UE was operating in:
the first network;
a network different than the first network; or
a network of a different type than the first network;

B3. The method of any of embodiments B1-B2, wherein for each particular failure report, the first indication is one of the following:
a first variable, wherein a first value indicates the corresponding failure occurred while the UE was operating in the first network and a second value indicates the corresponding failure occurred while the UE was operating in a network different than the first network; or
presence or absence of a second variable, wherein presence indicates the corresponding failure occurred while the UE was operating in the first network and absence indicates the corresponding failure occurred while the UE was operating in a network different than the first network.

B4. The method of any of embodiments B1-B2, wherein for each particular failure report, the first indication is one of the following:
a first variable, wherein a first value indicates the corresponding failure occurred while the UE was operating in the first network and a second value indicates the corresponding failure occurred while the UE was operating in a network of a different type than the first network;
presence or absence of a second variable, wherein presence indicates the corresponding failure occurred while the UE was operating in the first network and absence indicates the corresponding failure occurred while the UE was operating in a network of a different type than the first network;
a third variable, wherein each value is associated with a particular type of network in which the corresponding failure occurred.

B5. The method of embodiment B4, wherein the respective values for the third variable are associated with the following respective types:
public land mobile network (PLMN);
standalone non-public network (SNPN); and
public network integrated NPN (PNI-NPN).

B6. The method of any of embodiments B2-B5, wherein:
the one or more failure reports include a second failure report corresponding to a second failure that occurred while the UE was operating in a second network; and
one of the following applies:
the first network is a public land mobile network (PLMN) and the second network is a non-public network (NPN);
the first network is an NPN and the second network is a PLMN; or
the first network is a first NPN and the second network is a second NPN.

B7. The method of embodiment B2, wherein for each particular failure report, when the first indication indicates that the corresponding failure occurred while the UE was not operating in the first network, the message also includes an identifier of the network in which the corresponding failure occurred.

B8. The method of any of embodiments B1-B7, wherein the request includes a second indication that available failure reports are requested for UE failures that occurred in one of the following:
only the first network;
all networks;
one or more particular networks; or
to one or more particular types of networks.

B9. The method of embodiment B8, wherein the one or more particular networks are indicated by respective public land mobile network identities (PLMN IDs).

B10. The method of embodiment B9, wherein the received at least one failure report includes:
a first failure report corresponding to a UE failure that occurred in a non-public network (NPN) associated with a first PLMN ID; and
a second failure report corresponding to a UE failure that occurred in a PLMN associated with the first PLMN ID.

B11. The method of any of embodiments B1-B10, further comprising sending, to at least the UE, a third indication of network interest in failure reports pertaining to one or more of the following:
a network different than the first network; and
a network of a different type than the first network;

B12. The method of embodiment B11, wherein when the third indication indicates no network interest in failure reports pertaining to a network different than the first network, the first indication does not indicate availability of failure reports corresponding to failures that occurred while the UE was operating in a network different than the first network, even if such failure reports are available at the UE.

B13. The method of embodiment B11, wherein when the third indication indicates no network interest in failure reports pertaining to a network of a different type than the first network, the first indication does not indicate availability of failure reports corresponding to failures that occurred while the UE was operating in a network of a different type than the first network, even if such failure reports are available at the UE.

C1. A user equipment (UE) configured for failure reporting in a cell of a first network, the UE comprising:
  radio interface circuitry configured to communicate with a network node serving the cell; and
  processing circuitry operably coupled to the radio interface circuitry, whereby the processing circuitry and radio interface circuitry are configured to perform operations corresponding to any of the methods of embodiments A1-A13.

C2. A user equipment (UE) configured for failure reporting in a cell of a first network, the UE being arranged to perform operations corresponding to any of the methods of embodiments A1-A13.

C3. A non-transitory, computer-readable medium storing computer-executable instructions that, when executed by processing circuitry of a user equipment (UE) configured for failure reporting in a cell of a first network, configure the UE to perform operations corresponding to any of the methods of embodiments A1-A13.

C4. A computer program product comprising computer-executable instructions that, when executed by processing circuitry of a user equipment (UE) configured for failure reporting in a cell of a first network, configure the UE to perform operations corresponding to any of the methods of embodiments A1-A13.

D1. A network node configured to serve a cell in a first network and to receive failure reports by a user equipment (UE) operating in the cell, the network node comprising:
  radio network interface circuitry configured to communicate with the UE; and
  processing circuitry operatively coupled to the radio network interface circuitry, whereby the processing circuitry and the radio network interface circuitry are configured to perform operations corresponding to any of the methods of embodiments B1-B13.

D2. A network node configured to serve a cell in a first network and to receive failure reports by a user equipment (UE) operating in the cell, the network node being further arranged to perform operations corresponding to any of the methods of embodiments B1-B13.

D3. A non-transitory, computer-readable medium storing computer-executable instructions that, when executed by processing circuitry of a network node configured to serve a cell in a first network and to receive failure reports by a user equipment (UE) operating in the cell, configure the network node to perform operations corresponding to any of the methods of embodiments B1-B13.

D4. A computer program product comprising computer-executable instructions that, when executed by processing circuitry of a network node configured to serve a cell in a first network and to receive failure reports by a user equipment (UE) operating in the cell, configure the network node to perform operations corresponding to any of the methods of embodiments B 1-B13.

The invention claimed is:

1. A method for failure reporting by a user equipment, UE, operating in a cell of a first network, the method comprising:
  sending, to a network node serving the cell, a message that includes a first indication of availability of one or more failure reports, each available failure report corresponds to a failure that occurred while the UE was operating in a network different than the first network and comprising one of the following:
    another network of the same type as the first network, the first network being selected from a non-public network, NPN, standalone NPN, SNPN, and a public network integrated NPN, PNI-NPN;
    or
    a network of a different type than the first network;
  receiving, from the network node, a request for at least a portion of the failure reports indicated as available by the first indication; and
  sending at least one of the available failure reports to the network node, in accordance with the request.

2. The method of claim 1, wherein for each available failure report, the first indication indicates whether the corresponding failure occurred while the UE was operating in:
  another network of the same type as the first network;
  or
  a network of a different type than the first network.

3. The method of claim 1, wherein for each available failure report, the first indication is one of the following:
  a first variable that can take on at least first and second values, wherein the first value indicates the corresponding failure occurred while the UE was operating in the first network and the second value indicates the corresponding failure occurred while the UE was operating in a network different than the first network; or
  presence or absence of a second variable, wherein presence indicates the corresponding failure occurred while the UE was operating in the first network and absence indicates the corresponding failure occurred while the UE was operating in a network different than the first network.

4. The method of claim 1, wherein for each available failure report, the first indication is one of the following:
  a first variable that can take on at least first and second values, wherein the first value indicates the corresponding failure occurred while the UE was operating in the first network and the second value indicates the corresponding failure occurred while the UE was operating in a network of a different type than the first network;
  presence or absence of a second variable, wherein presence indicates the corresponding failure occurred while the UE was operating in the first network and absence indicates the corresponding failure occurred while the UE was operating in a network of a different type than the first network; or
  a third variable that can take on a plurality of values, wherein each value is associated with a particular type of network in which the corresponding failure occurred.

5. The method of claim 4, wherein the respective values for the third variable are associated with the following respective types of networks:
  public land mobile network, PLMN;
  standalone non-public network, SNPN; and
  public network integrated NPN, PNI-NPN.

6. The method of claim 2, wherein:
  the one or more failure reports include a second failure report corresponding to a second failure that occurred while the UE was operating in a second network; and
  one of the following applies:
    the first network is a public land mobile network, PLMN, and the second network is a non-public network, NPN;
    the first network is an NPN and the second network is a PLMN; or the first network is a first NPN and the second network is a second NPN.

7. The method of claim 1, wherein for each available failure report that corresponds to a failure that occurred while the UE was operating in a network different than the first network, the first indication includes an identifier of the network in which the corresponding failure occurred.

8. The method of claim 1, wherein the request includes a second indication that available failure reports are requested for UE failures that occurred in one of the following:
   only the first network;
   all networks;
   one or more particular networks; or
   one or more particular types of networks.

9. The method of claim 8, wherein the one or more particular networks are indicated by respective public land mobile network identities, PLMN IDs.

10. The method of claim 9, wherein the at least one failure report includes:
   a first failure report corresponding to a UE failure that occurred in a non-public network, NPN, associated with a first PLMN ID; and
   a second failure report corresponding to a UE failure that occurred in a PLMN associated with the first PLMN ID.

11. The method of claim 1, further comprising receiving, from the network node, a third indication of network interest in failure reports pertaining to one or more of the following:
   a network different than the first network; and
   a network of a different type than the first network.

12. The method of claim 11, wherein when the third indication indicates no network interest in failure reports pertaining to a network different than the first network, the first indication does not indicate availability of failure reports corresponding to failures that occurred while the UE was operating in a network different than the first network, even when such failure reports are available at the UE.

13. The method of claim 11, wherein when the third indication indicates no network interest in failure reports pertaining to a network of a different type than the first network, the first indication does not indicate availability of failure reports corresponding to failures that occurred while the UE was operating in a network of a different type than the first network, even when such failure reports are available at the UE.

14. A method for a network node to receive failure reports from a user equipment, UE, in a cell of a first network, the method comprising:
   receiving, from the UE, a message that includes a first indication of availability of one or more failure reports, each available failure report corresponding to a failure that occurred while the UE was operating in a network different than the first network and comprising one of the following:
      another network of the same type as the first network, the first network being selected from a non-public network, NPN, standalone NPN, SNPN and a public network integrated NPN, PNI-NPN;
      or
      a network of a different type than the first network;
   sending, to the UE, a request for at least a portion of the failure reports indicated as available by the first indication; and
   receiving at least one of the available failure reports from the UE, in accordance with the request.

15. The method of claim 14, wherein for each available failure report, the first indication indicates whether the corresponding failure occurred while the UE was operating in:
   another network of the same type as the first network; or
   a network of a different type than the first network.

16. The method of claim 14, wherein for each available failure report, the first indication is one of the following:
   a first variable that can take on at least first and second values, wherein the first value indicates the corresponding failure occurred while the UE was operating in the first network and the second value indicates the corresponding failure occurred while the UE was operating in a network different than the first network; or
   presence or absence of a second variable, wherein presence indicates the corresponding failure occurred while the UE was operating in the first network and absence indicates the corresponding failure occurred while the UE was operating in a network different than the first network.

17. The method of claim 14, wherein for each available failure report, the first indication is one of the following:
   a first variable that can take on at least first and second values, wherein the first value indicates the corresponding failure occurred while the UE was operating in the first network and the second value indicates the corresponding failure occurred while the UE was operating in a network of a different type than the first network;
   presence or absence of a second variable, wherein presence indicates the corresponding failure occurred while the UE was operating in the first network and absence indicates the corresponding failure occurred while the UE was operating in a network of a different type than the first network; or
   a third variable that can take on a plurality of values, wherein each value is associated with a particular type of network in which the corresponding failure occurred.

18. The method of claim 17, wherein the respective values for the third variable are associated with the following respective types:
   public land mobile network, PLMN;
   standalone non-public network, SNPN; and
   public network integrated NPN, PNI-NPN.

19. A user equipment, UE configured for failure reporting in a cell of a first network, the UE comprising:
   transceiver circuitry configured to communicate with a network node serving the cell; and
   processing circuitry operably coupled to the transceiver circuitry, whereby the processing circuitry and transceiver circuitry are configured to:
      send, to the network node, a message that includes a first indication of availability of one or more failure reports, each available failure report corresponding to a failure that occurred while the UE was operating in a network different than the first network and comprising one of the following:
         another network of the same type as the first network, the first network being selected from a non-public network, NPN, standalone NPN, SNPN and a public network integrated NPN, PNI-NPN;
         or
         a network of a different type than the first network;

receive, from the network node, a request for at least a portion of the failure reports indicated as available by the first indication; and send at least one of the available failure reports to the network node, in accordance with the request.

20. A network node configured to receive failure reports from a user equipment, UE in a cell of a first network, the network node comprising:

radio network interface circuitry configured to communicate with the UE; and processing circuitry operatively coupled to the radio network interface circuitry, whereby the processing circuitry and the radio network interface circuitry are configured to:

receive, from the UE, a message that includes a first indication of availability of one or more failure reports, each available failure report corresponding to a failure that occurred while the UE was operating in a network different than the first network and comprising one of the following:

another network of the same type as the first network, the first network being selected from a non-public network, NPN, standalone NPN, SNPN and a public network integrated NPN, PNI-NPN;

or a network of a different type than the first network;

send, to the UE, a request for at least a portion of the failure reports indicated as available by the first indication; and receive at least one of the available failure reports from the UE, in accordance with the request.

* * * * *